United States Patent
Goerig et al.

(10) Patent No.: US 9,835,037 B2
(45) Date of Patent: Dec. 5, 2017

(54) DUCTED THRUST PRODUCING SYSTEM WITH ASYNCHRONOUS FAN BLADE PITCHING

(71) Applicant: GENERAL ELECTRIC COMPANY, Schenectady, NY (US)

(72) Inventors: Trevor Goerig, Cincinnati, OH (US); Darek Tomasz Zatorski, Fort Wright, KY (US); Tsuguji Nakano, West Chester, OH (US); Patrick John Lonneman, Erlanger, KY (US)

(73) Assignee: General electric Company, Schenectady, NY (US)

( * ) Notice: Subject to any disclaimer, the term of this patent is extended or adjusted under 35 U.S.C. 154(b) by 358 days.

(21) Appl. No.: 14/746,426

(22) Filed: Jun. 22, 2015

(65) Prior Publication Data
US 2016/0369639 A1    Dec. 22, 2016

(51) Int. Cl.
*F02C 3/04*    (2006.01)
*F01D 7/00*    (2006.01)
(Continued)

(52) U.S. Cl.
CPC .................. *F01D 7/00* (2013.01); *F01D 5/02* (2013.01); *F01D 5/3007* (2013.01); *F01D 7/02* (2013.01);
(Continued)

(58) Field of Classification Search
CPC . F01D 15/00; F01D 25/24; F01D 5/02; F01D 5/3007; F01D 7/00; F01D 7/02; F02C 3/04; F02K 1/66; F04D 27/0246; F04D 29/323; F05D 2220/32; F05D 2220/36; F05D 2240/20; F05D 2240/35
See application file for complete search history.

(56) References Cited

U.S. PATENT DOCUMENTS 3,153,454 A    10/1964    Gaubis
3,163,231 A    12/1964    Barnes et al.
(Continued)

FOREIGN PATENT DOCUMENTS

| EP | 1808579 A2 | 7/2007 |
|---|---|---|
| JP | S56501446 A | 10/1981 |
| JP | H01262330 A | 10/1989 |

OTHER PUBLICATIONS

A European Search Report and Opinion issued in connection with corresponding EP Application No. 16175691.1 dated Nov. 21, 2016.
(Continued)

*Primary Examiner* — Jesse Bogue
(74) *Attorney, Agent, or Firm* — General Electric Company; Pamela A. Kachur

(57) ABSTRACT

An actuation assembly for a variable pitch fan for a gas turbine engine is provided. The actuation assembly generally includes a plurality of fan blades, a scheduling ring, and a plurality of linkage arms. The plurality of fan blades are rotatably coupled to a disk and extend radially therefrom. The scheduling ring is rotatable relative to the disk and has a plurality of slots. Each of the plurality of linkage arms are operatively coupled to one of the plurality of fan blades and to one of the plurality of slots. Each of the plurality of fan blades rotate according to a blade pitch schedule defined by the slot to which it is operatively coupled, and at least two of the plurality of slots define different blade pitch schedules.

18 Claims, 4 Drawing Sheets

(51) Int. Cl.
*F04D 27/02* (2006.01)
*F04D 29/32* (2006.01)
*F01D 5/02* (2006.01)
*F01D 5/30* (2006.01)
*F01D 15/00* (2006.01)
*F01D 25/24* (2006.01)
*F02K 1/66* (2006.01)
*F01D 7/02* (2006.01)

(52) U.S. Cl.
CPC ............ *F01D 15/00* (2013.01); *F01D 25/24* (2013.01); *F02C 3/04* (2013.01); *F02K 1/66* (2013.01); *F04D 27/0246* (2013.01); *F04D 29/323* (2013.01); *F05D 2220/32* (2013.01); *F05D 2220/36* (2013.01); *F05D 2240/20* (2013.01); *F05D 2240/35* (2013.01)

(56) References Cited

U.S. PATENT DOCUMENTS

| | | | |
|---|---|---|---|
| 3,687,569 A | 8/1972 | Klompas | |
| 3,876,334 A | 4/1975 | Andrews | |
| 3,893,789 A | 7/1975 | Andrews | |
| 3,922,852 A | 12/1975 | Drabek | |
| 3,986,794 A | 10/1976 | Korn | |
| 4,021,142 A * | 5/1977 | Violette | F02K 3/06 416/160 |
| 4,047,842 A | 9/1977 | Avena et al. | |
| 4,124,330 A | 11/1978 | Barnes | |
| 4,370,097 A | 1/1983 | Hanson et al. | |
| 4,447,009 A * | 5/1984 | Wiley | F02K 1/1292 239/265.39 |
| 4,968,217 A | 11/1990 | Newton | |
| 5,931,637 A | 8/1999 | Wheeler | |
| 6,508,622 B1 | 1/2003 | Neumeier | |
| 6,991,426 B2 | 1/2006 | Pietricola | |
| 8,075,270 B2 | 12/2011 | Violette et al. | |
| 8,834,119 B2 | 9/2014 | Balk et al. | |
| 2015/0056057 A1* | 2/2015 | Lin | F01D 5/141 415/1 |
| 2016/0348530 A1* | 12/2016 | Sebrecht | F01D 17/162 |

OTHER PUBLICATIONS

Japanese Office Action issued in connection with corresponding JP Application No. 2016120341 on May 23, 2017.

* cited by examiner

DUCTED THRUST PRODUCING SYSTEM WITH ASYNCHRONOUS FAN BLADE PITCHING

FIELD OF THE INVENTION

The present subject matter relates generally to a fan for a gas turbine engine, or more particularly to a fan configured for asynchronous fan blade pitching in a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, an airflow is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the compressor section and is then routed through the exhaust section, e.g., to atmosphere. In particular configurations, the turbine section is mechanically coupled to the compressor section by a shaft extending along an axial direction of the gas turbine engine.

The fan includes a plurality of blades having a radius larger than the core of the gas turbine engine. The fan and plurality of blades may also be mechanically coupled to the shaft such that they rotate along with the turbine. In certain configurations, the fan may be mechanically coupled to the shaft through a gear box, such that the fan can have a different rotational speed than the turbine shaft. A rotatable hub can be provided covering at least a portion of the fan and rotating along with the fan. Rotation of the plurality of blades generates thrust for the gas turbine engine and provides airflow to the compressor section of the core. Additionally, a plurality outlet guide vanes can direct an airflow from the blades to, e.g., reduce an amount of noise generated by the gas turbine engine and enhance performance of the gas turbine engine.

For at least some gas turbine engines, the fan is a variable pitch fan. It is desirable to vary the pitch of the fan blades by rotating each blade about respective pitch axes to further increase performance of the gas turbine engine. For example, a primary reason for changing blade pitch is to adjust the blade's angle of attack for optimal performance based on the present air speed of the aircraft and power level of the engine. In addition, the pitch of fan blades may be used to reverse the airflow through the core of the engine, thus providing reverse thrust to aerodynamically brake a landing aircraft.

In general, fan performance may be improved by increasing the number of blades. More specifically, it is desirable to maintain a blade solidity value of greater than one. Blade solidity is the ratio of the blade chord, represented by its length, over the blade pitch, which is the circumferential spacing of the blades at a given radius or diameter from the axial centerline axis. In other words, blade pitch is the circumferential length at a given diameter divided by the number of blades in the full fan blade row. Notably, when fan blades are designed with a solidity factor greater than one, adjacent blades will interfere with each other if they pass through flat pitch simultaneously.

Therefore, although fan blades with solidity greater than one are desirable for improved performance of the fan and engine, such a design can result in blade conflict when rotating into a reverse thrust configuration. Specifically, if all blades are rotated in unison, such that they rotate through flat pitch simultaneously, blade contact might occur.

Accordingly, a variable pitch fan for gas turbine engine including components allowing for asynchronous pitching is desirable. In addition, it is desirable that such a fan configuration and components remain lightweight and easy to assembly and service. More particularly, a fan for a gas turbine engine configured for asynchronous blade pitching while also allowing a higher fan blade solidity would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an actuation assembly for a variable pitch fan for a gas turbine engine is provided. The actuation assembly generally includes a plurality of fan blades, a scheduling ring, and a plurality of linkage arms. The plurality of fan blades are rotatably coupled to a disk and extend radially therefrom. The scheduling ring is rotatable relative to the disk and has a plurality of slots. Each of the plurality of linkage arms are operatively coupled to one of the plurality of fan blades and to one of the plurality of slots. Each of the plurality of fan blades rotate according to a blade pitch schedule defined by the slot to which it is operatively coupled, and at least two of the plurality of slots define different blade pitch schedules.

In another exemplary embodiment of the present disclosure, a ducted gas turbine engine is provided. The gas turbine engine defines an axial direction and a radial direction and generally includes a core engine, a variable pitch fan, and an actuation assembly. The variable pitch fan is arranged in flow communication with the core engine and includes a disk. A plurality of fan blades are coupled to the disk and extend in a radial direction. The disk and the plurality of fan blades are configured to rotate about the axial direction of the ducted gas turbine engine. The actuation assembly is configured to change the pitch of the plurality of fan blades about the radial direction and includes a scheduling ring defining a first plurality of slots corresponding to a first blade pitch schedule and a second plurality of slots corresponding to a second blade pitch schedule. A plurality of linkage arms each have a first end fixedly connected to one of the plurality of fan blades and a second end slidably coupled to one of the first or second plurality of slots. The plurality of fan blades rotate according to the first or second blade pitch schedule as the scheduling ring is rotated relative to the disk.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
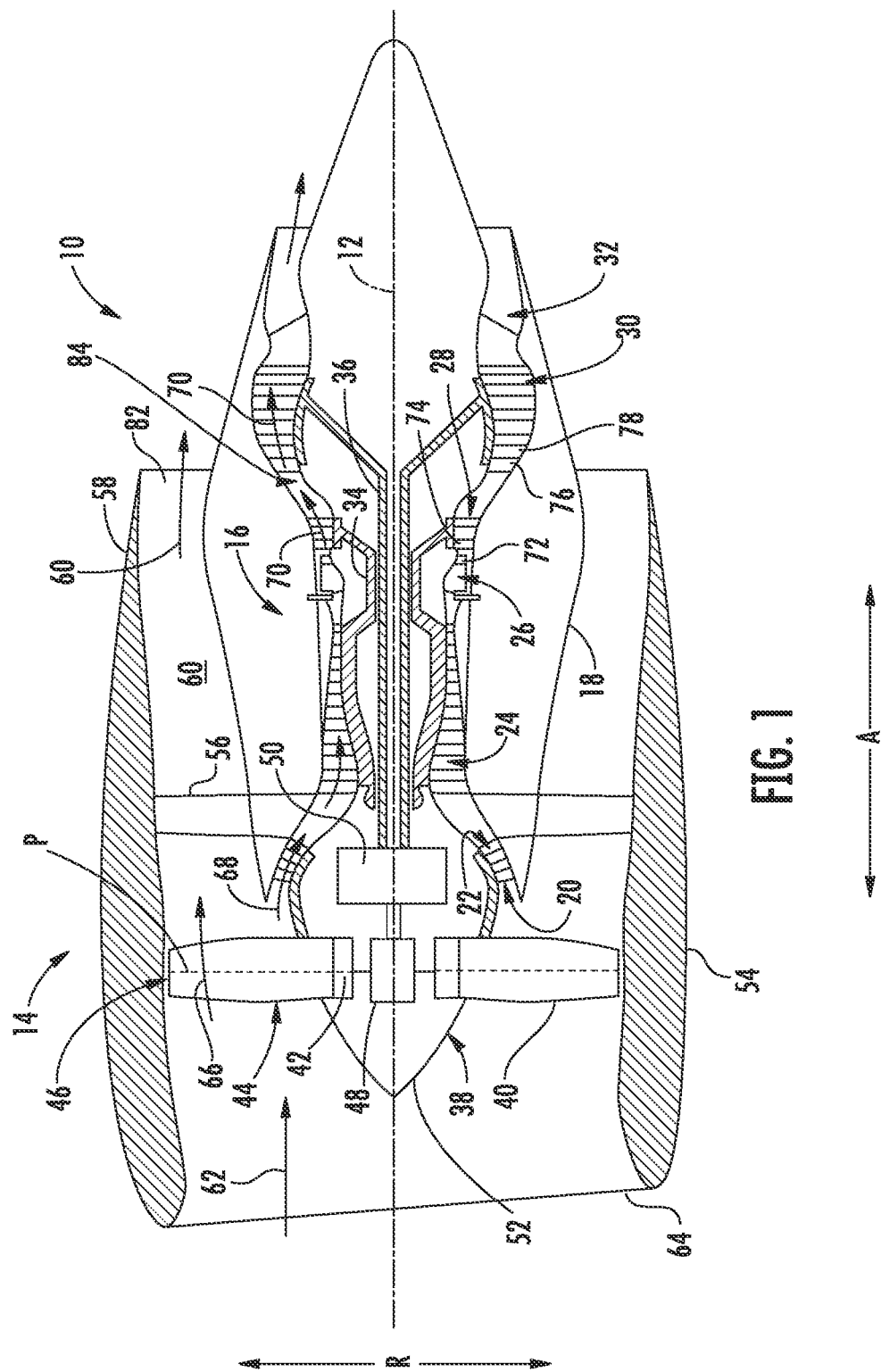
FIG. 1 is a schematic cross-sectional view of a gas turbine engine according to an exemplary embodiment of the present subject matter.

Repeat use of reference characters in the present specification and drawings is intended to represent the same or analogous features or elements of the present invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. In addition, it should be appreciated that the term "fluid" as used herein includes any material or medium that flows, including, but not limited to, gas and air.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the plurality of fan blades 40 defines a leading edge 44, or upstream edge, and a tip 46 defined at a radially outer edge of each respective fan blade 40. Each fan blade 40 is also rotatable relative to the disk 42 about a pitch axis P by virtue of the fan blades 40 being operatively coupled to a suitable actuation assembly 48 configured to vary the pitch of the fan blades 40 in a manner described in detail below. The fan blades 40, disk 42, and actuation assembly 48 are together rotatable about the longitudinal axis 12 by LP shaft 36 across a power gear box 50. The power gear box 50 includes a plurality of gears for stepping down the rotational speed of the LP shaft 36 to a more efficient rotational fan speed. Additionally, for the embodiment depicted, the disk 42 of the variable pitch fan 38 is covered by rotatable front hub 52 aerodynamically contoured to promote an airflow through the plurality of fan blades 40.

Referring still to the exemplary turbofan engine 10 of FIG. 1, the exemplary fan section 14 additionally includes an annular fan casing or outer nacelle 54 that circumferentially surrounds the fan 38 and/or at least a portion of the core turbine engine 16. It should be appreciated that the nacelle 54 may be configured to be supported relative to the core turbine engine 16 by a plurality of circumferentially-spaced outlet guide vanes 56. Moreover, a downstream section 58 of the nacelle 54 may extend over an outer portion of the core turbine engine 16 so as to define a bypass airflow passage 60 therebetween.

During operation of the turbofan engine 10, a volume of air 62 enters the turbofan 10 through an associated inlet 64 of the nacelle 54 and/or fan section 14. As the volume of air 62 passes across the fan blades 40, a first portion of the air as indicated by arrows 66 is directed or routed into the bypass airflow passage 60 and a second portion of the air as indicated by arrow 68 is directed or routed into the LP compressor 22. The ratio between the first portion of air 66 and the second portion of air 68 is commonly known as a bypass ratio. The pressure of the second portion of air 68 is then increased as it is routed through the high pressure (HP) compressor 24 and into the combustion section 26, where it is mixed with fuel and burned to provide combustion gases 70.

The combustion gases 70 are routed through the HP turbine 28 where a portion of thermal and/or kinetic energy from the combustion gases 70 is extracted via sequential stages of HP turbine stator vanes 72 that are coupled to the outer casing 18 and HP turbine rotor blades 74 that are coupled to the HP shaft or spool 34, thus causing the HP shaft or spool 34 to rotate, thereby supporting operation of the HP compressor 24. The combustion gases 70 are then routed through the LP turbine 30 where a second portion of thermal and kinetic energy is extracted from the combustion gases 70 via sequential stages of LP turbine stator vanes 76 that are coupled to the outer casing 18 and LP turbine rotor blades 78 that are coupled to the LP shaft or spool 36, thus causing the LP shaft or spool 36 to rotate, thereby supporting operation of the LP compressor 22 and/or rotation of the fan 38.

The combustion gases 70 are subsequently routed through a jet exhaust nozzle section 82 of the core turbine engine 16 to provide propulsive thrust. Simultaneously, the pressure of the first portion of air 66 is substantially increased as the first portion of air 66 is routed through the bypass airflow passage 60 before it is exhausted from a fan nozzle exhaust section 82 of the turbofan 10 also providing propulsive thrust. The HP turbine 28, the LP turbine 30, and the jet exhaust nozzle section 32 at least partially define a hot gas path 84 for routing the combustion gases 70 through the core turbine engine 16.

Figure 2:
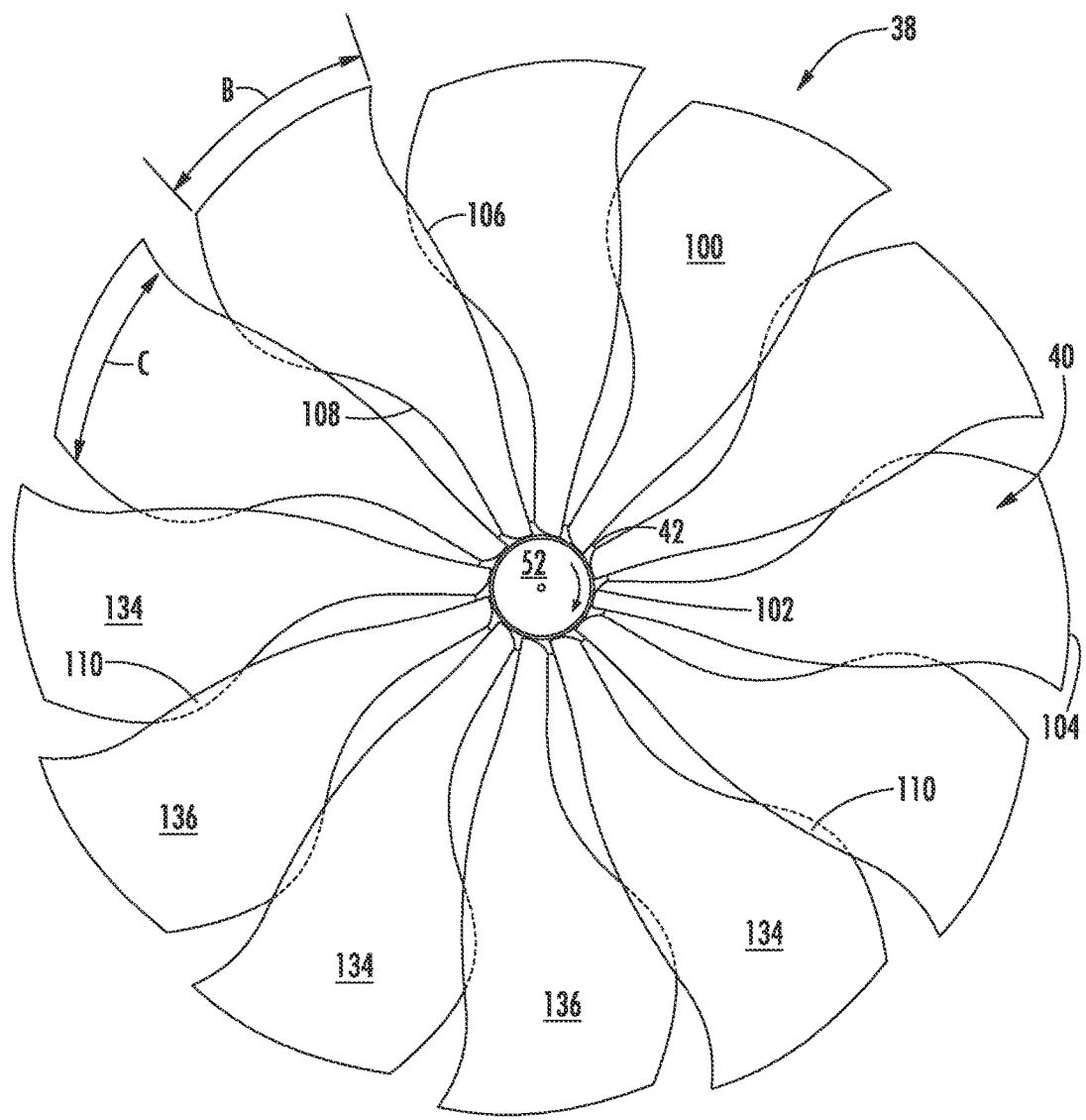
FIG. 2 is a forward-facing-aft elevational view of the fan illustrated in FIG. 1 in accordance with an exemplary embodiment of the present disclosure.
Figure 3:
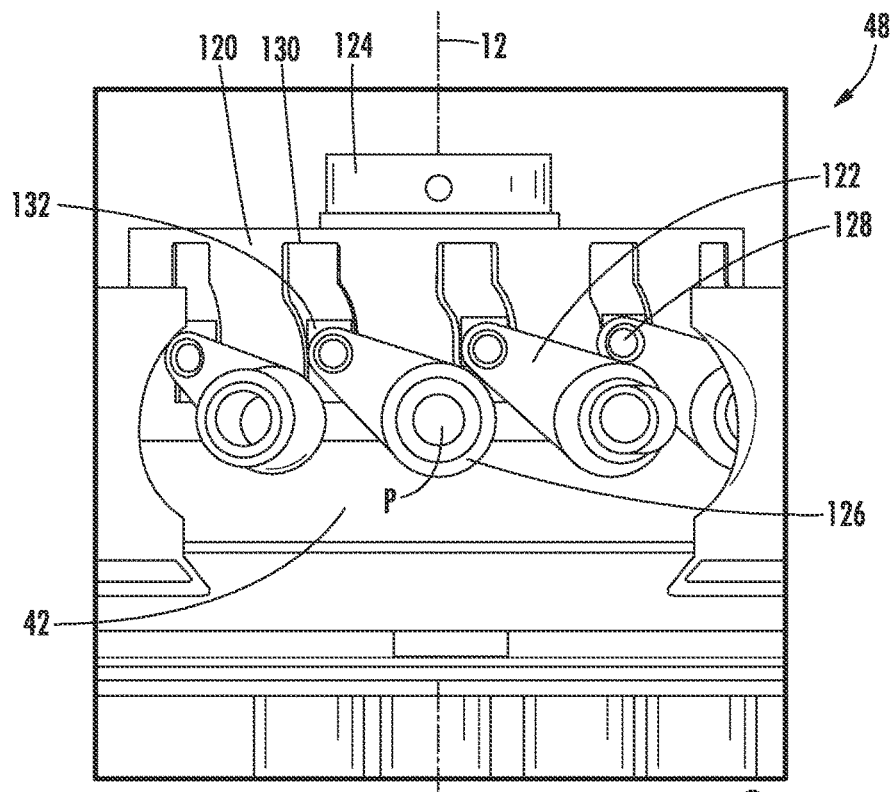
FIG. 3 is a schematic side view of an actuation assembly of the exemplary variable pitch fan of FIG. 2, where the fan blades are in a feathered position.
Figure 4:
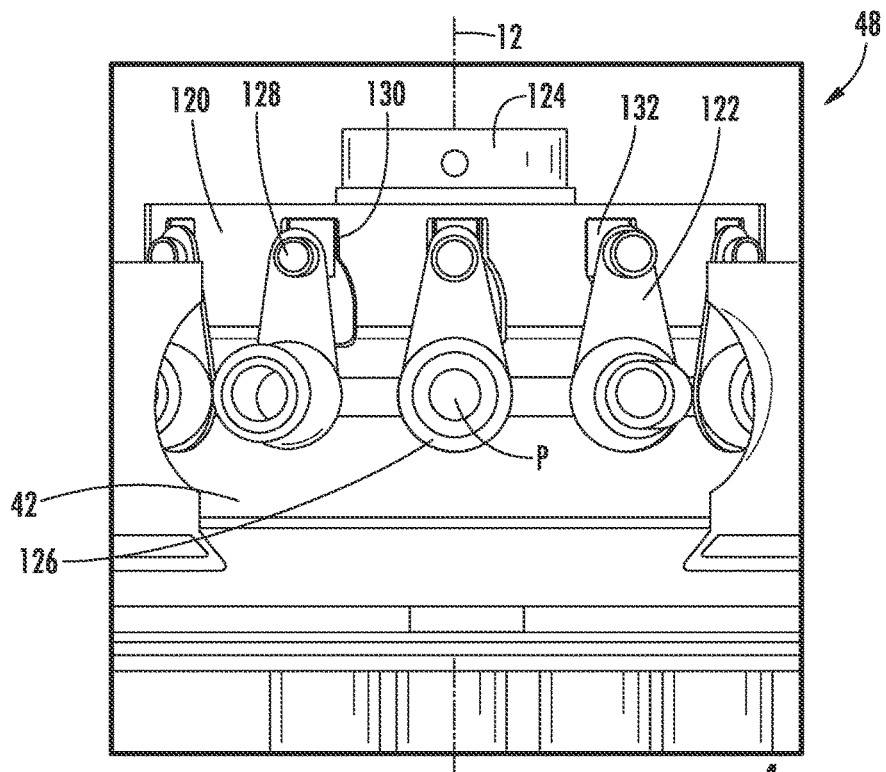
FIG. 4 is a schematic side view of an actuation assembly of the exemplary variable pitch fan of FIG. 2, where the fan blades are in a flat pitch position.

Referring now to FIG. 2 the fan 38 will be described in greater detail. FIG. 2 provides a forward-facing-aft elevational view of the fan 38 of the exemplary turbofan engine 10 of FIG. 1. For the exemplary embodiment depicted, the fan 38 includes twelve (12) fan blades 40. From a loading standpoint, such a blade count enables the span of each fan blade 40 to be reduced such that the overall diameter of fan 38 is also able to be reduced (e.g., to about twelve feet in the exemplary embodiment). That said, in other embodiments, fan 38 may have any suitable blade count and any suitable diameter. For example, in one suitable embodiment, the fan 38 may have at least eight (8) fan blades 40. In another suitable embodiment, the fan 38 may have at least twelve (12) fan blades 40. In yet another suitable embodiment, the fan 38 may have at least fifteen (15) fan blades 40. In yet another suitable embodiment, the fan 38 may have at least eighteen (18) fan blades 40. The illustrated embodiment of the variable pitch fan 38 comprises twelve fan blades 40.

Each fan blade 40 may have a suitable aerodynamic profile including a generally concave pressure side and a circumferentially opposite, generally convex suction side 100. Each fan blade 40 extends from an inner root end 102, which is rotatably coupled to disk 42, to a radially outer distal tip 104 disposed closely adjacent to the fan casing or nacelle 54 for providing a relatively small tip clearance or gap therebetween. As shown, each fan blade 40 defines a chord length C that extends between opposite leading edge 106 and trailing edge 108, with the chord varying in length over the span of the fan blade 40.

The fan 38 also has a corresponding solidity which is a conventional parameter equal to the ratio of the blade chord C, as represented by its length, divided by the circumferential pitch B or spacing from blade to blade at the corresponding span position or radius. The circumferential pitch is equal to the circumferential length at the specific radial span divided by the total number of fan blades in the blade row. Accordingly, the solidity is directly proportional to the number of blades and chord length and inversely proportional to the diameter.

Typical high solidity turbofans have adjacent fan blades 40 that substantially overlap each other circumferentially due to the high solidity and high stagger of the airfoils. For example, as shown in FIG. 2, the fan blades 40 have high solidity and adjacent blades would contact each other when passing through the flat pitch position. Due to the solidity of the fan blades 40, it can be seen that the fan blades 40 would overlap at least in region 110 if they pass through flat pitch at the same time. In order to achieve reverse thrust from the fan 38, it is necessary that the fan blades 40 pass through flat pitch. However, given the configuration shown in FIG. 2, unacceptable blade contact will occur if the fan blades 40 rotate in unison through flat pitch. Therefore, a fan 38 configured for asynchronous blade pitching is described below with respect to FIGS. 3-6. Such a system can ensure that the fan blades 40 do not pass through flat pitch at the same time, as well as provide other performance-related improvements to fan 38 operation, as discussed below.

Referring now generally to FIGS. 3 through 6, a blade pitch actuation assembly 48 in accordance with an exemplary embodiment of the present disclosure is depicted. As mentioned above, each fan blade 40 is rotatable relative to the disk 42 about a pitch axis P. The fan blades 40, disk 42, and actuation assembly 48 are together rotatable about the longitudinal axis 12 by LP shaft 36 across a power gear box 50.

The actuation assembly 48 generally comprises a scheduling ring 120, plurality of linkage arms 122, and an electric motor 124. Each fan blade 40 may be rotatably coupled to the disk 42 through a first end 126 of a corresponding linkage arm 122 such that the first end 126 and the corresponding fan blade 40 may rotate about pitch axis P relative to disk 42. In this regard, the fan blade 40 may be fixedly connected to the first end 126 of the corresponding linkage arm 122, such that rotation of the linkage arm 122 causes the fan blade 40 to rotate relative to the disk 42.

A second end 128 of the linkage arm 122 may be slidably connected to one of the plurality of slots 130 defined in scheduling ring 120. For example, the second end 128 may be rotatably connected to a sliding member 132. The sliding member 132 may be slidably received in a slot 130 of the scheduling ring 120. The scheduling ring 120 is rotatable about longitudinal centerline 12 relative to the disk 42 and is operatively coupled with the electric motor 124, which is fixed relative to the disk 42.

Each of the plurality of slots 130 on the scheduling ring 120 defines a blade pitch schedule. In this regard, for a given angle of rotation of the scheduling ring 120, the blade pitch schedule determines the actual pitch angle of the fan blades 40. In operation, the electric motor 124 rotates the scheduling ring 120 relative to the disk 42. As the scheduling ring 120 rotates, sliding member 132 moves along slot 130 and the angular position of the linkage arm 122 changes. As each linkage arm 122 rotates, the corresponding fan blade 40 rotates as well, thus rotating each fan blade 40 about pitch axis P.

Therefore, by rotating the scheduling ring 120 relative to the disk 42, each of the plurality of fan blades 40 rotates about its respective pitch axis P according to a blade schedule defined by the slot 130 to which it is coupled by linkage arm 122. By defining different blade pitch schedules, the rotation of the fan blades 40 may be controlled independently of each other. Therefore, for example, if alternating fan blades 40 are rotated according to different blade pitch scheduling, conflict through flat pitch may be avoided. In addition, the pitch schedule may be adjusted to improve performance of the fan blade 40.

The blade pitch schedules may depend, for example, on whether the aircraft is in a normal flight phase, a flat pitch transition phase, or a reverse thrust configuration. For example, the variable pitch fan 38 may be configured for normal flight phase when the fan blades 40 have a pitch of greater than 8°. In addition, when the fan blades 40 are within 8° of flat pitch (i.e., between −8° and 8°), the variable pitch fan 38 may be operating in a flat pitch transition phase. The fan blades 40 may be in a reverse thrust phase when angled at −8° or less. One skilled in the art will appreciate that these ranges are used only for the purpose of explanation, and that phases and blade schedules may be defined in a variety of other ways to improve performance of the variable pitch fan 38 and engine 10.

In an example embodiment, the plurality of fan blades 40 rotate according to different pitch schedules in order to avoid conflict as the fan blades 40 rotate through flat pitch. More specifically, as shown in FIG. 2, a first set of fan blades 134 may rotate according to a first blade pitch schedule, and an alternating, second set of fan blades 136 may rotate according to a second blade pitch schedule. The first and second blade pitch schedule may be the same for a first phase of rotation, which may correspond to normal flight operation, but the pitch schedules may deviate from one another as the fan blades 40 enter flat pitch. For example, as soon as the pitch of the plurality of fan blades 40 reach within 8° of flat pitch, the rotational speed of the first set of fan blades 134 may increase while the rotational speed of the second set of fan blades 136 may decrease. In this manner, the first set of blades 134 may pass through flat pitch sequentially ahead of the second set of blades 136, thus avoiding contact through flat pitch. After all fan blades 40 have passed through flat pitch and begin to generate reverse thrust, the first and second blade pitch schedules may once again sync up with each other so that all fan blades 40 rotate in unison. Alternatively, however, the blade schedules may remain offset in order to ensure reverse thrust is achieved without choking the air going to the core 16 of the engine 10, or to achieve other performance improvements.

One skilled in the art will appreciate that the blade pitch schedules discussed above are only exemplary, and that any other blade pitch schedule or schedules may be used as needed for performance. For example, more than two blade pitch schedules may be used. Indeed, every fan blade 40 could rotate according to its own pitch schedule. All such variations are contemplated as within the scope of the present disclosure.

Figure 5:
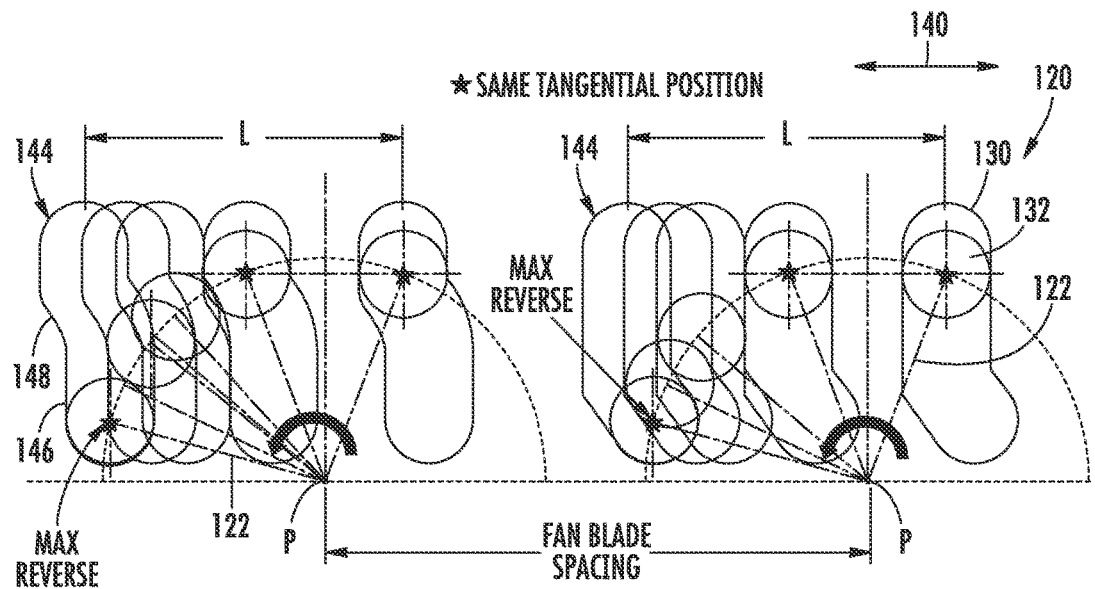
FIG. 5 is a diagrammatic view of the pitch scheduling ring showing the scheduling slot for two adjacent fan blades as the scheduling ring is rotated in accordance with embodiments of the present disclosure.
Figure 6:
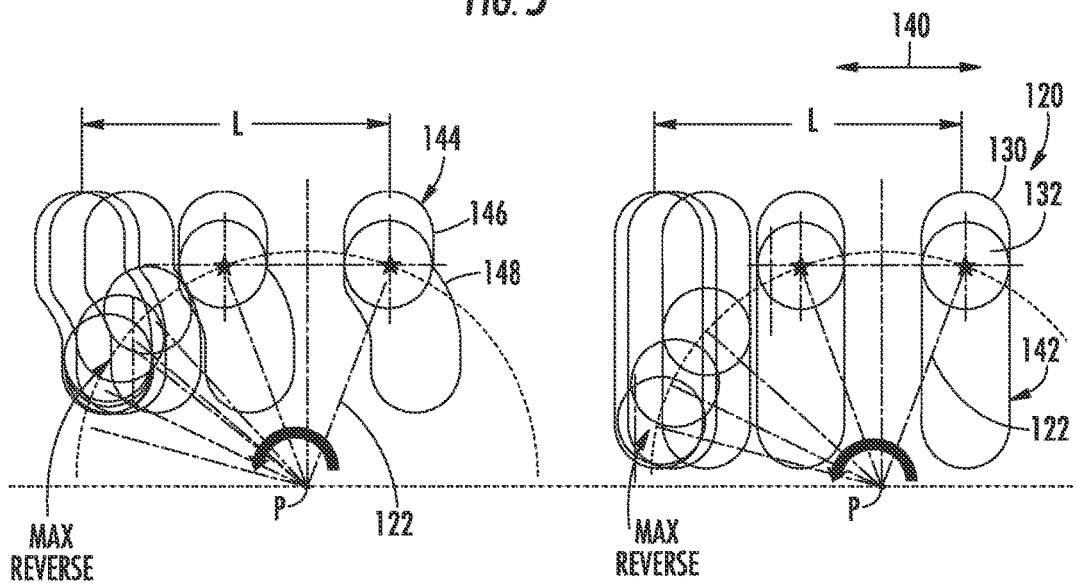
FIG. 6 a diagrammatic view of the pitch scheduling ring showing the scheduling slot for two adjacent fan blades as the scheduling ring is rotated in accordance with embodiments of the present disclosure.

Now referring to FIGS. 5 and 6, a schematic representation of the displacement of the sliding member 132 is shown. This representation depicts two adjacent fan blades 40 rotating according blade schedules defined by scheduling slots 130 in scheduling ring 120. In the illustrated embodiment, each fan blade 40 is centered about respective pitch axis P, where it is rotatably coupled to disk 42. Each linkage arm 122 is schematically represented by dotted line 122 and rotates a fixed radial distance about its respective pitch axis P. Sliding member 132 is rotatably connected to linkage arm 122 and is slidably coupled to scheduling slot 130.

As shown in the figures, as scheduling ring 120 rotates relative to disk 42, the scheduling slots 130 are generally translated in the direction indicated by arrow 140. For each angular position of the scheduling ring 120, the angular position of each fan blade 40 may be varied according to the shape of its respective scheduling slot 130. For example, referring specifically to FIG. 6, some scheduling slots 130 may be entirely linear in the vertical direction (e.g., linear scheduling slot 142). By contrast, some scheduling slots 130 may be non-linear (e.g., non-linear scheduling slot 144), for example, by having one or more linear portions 146 and one or more bent portions 148. In other example embodiments, the scheduling slots 130 may be curved, serpentine, or any other suitable shape.

Notably, when the scheduling ring 120 is rotated at a constant velocity, a linkage arm 122 connected to the entirely linear scheduling slot 142 will have a constant rotational speed about pitch axis P. By contrast, the rotational speed of a linkage arm 122 connected to a non-linear slot will vary according to the shape of its respective scheduling slot 130. In this manner, by alternately shaping each scheduling slot 130, alternating fan blades 40 may rotate into flat pitch at different times, such that fan blade 40 contact will not occur through flat pitch. In addition, adjacent scheduling slots 130 may have a similar profile throughout the fan blade 40 angle range, such that the fan blades 40 rotate in unison throughout their range with the exception of the point where they enter flat pitch.

One skilled in the art will appreciate that the above-described mechanism for actuating the rotation of the fan blades is only one exemplary mechanism for achieving asynchronous fan blade pitching. Other mechanisms will be evident to a skilled artisan based on the present disclosure. Any such variations or modifications are contemplated as within the scope of the present disclosure.

The above-described embodiments facilitate enabling thrust reverse for a variable pitch fan 38 with the fan blade 40 solidity greater than one without a need for a heavy thrust reverse mechanism. Particularly, the proposed fan blade 40 pitch change mechanism enables 2-phase asynchronous fan blade 40 pitching, such that each fan blade 40 rotates on a different schedule through flat pitch and/or reverse allowing the fan blades 40 to pass each other without contact. For example, the pitch change mechanism can rotate six out of twelve fan blades 40 on a different schedule through reverse, thus allowing reverse thrust to be achieved without contact between the fan blades 40 as they pass through flat pitch. All fan blades 40 may rotate on the same schedule throughout the entire flight envelope with the exception of the reverse condition. This proposed thrust producing system coupled with a high speed low pressure turbine 30 via a power gearbox 50 provides a very competitive engine 10 to the geared turbofan. Benefits of asynchronous fan blade 40 pitching include improvements in engine efficiency and specific fuel consumption. Installation is also simplified as compared to prior designs, fan operability is improved, and stall margin is increased. Other advantages will be apparent to those of skill in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An actuation assembly for a variable pitch fan for a gas turbine engine, the actuation assembly comprising:
   a plurality of fan blades rotatably coupled to a disk and extending axially therefrom;
   a scheduling ring rotatable relative to the disk and having a plurality of slots; and
   a plurality of linkage arms, each linkage arm operatively coupled to one of the plurality of fan blades and to one of the plurality of slots,
   wherein each of the plurality of fan blades rotates according to a blade pitch schedule defined by the slot to which it is operatively coupled, and wherein at least two of the plurality of slots define different blade pitch schedules, wherein each fan blade rotates on a different blade pitch schedule than adjacent fan blades.

2. The actuation assembly of claim 1, wherein each of the plurality of linkage arms has a first end fixedly connected to one of the plurality of fan blades and a second end slidably connected to one of the plurality of slots.

3. The actuation assembly of claim 1, wherein the variable pitch fan comprises between eight and twenty fan blades rotatably coupled to the disk.

4. The actuation assembly of claim 1, wherein the variable pitch fan comprises twelve fan blades.

5. The actuation assembly of claim 1, wherein a first set of fan blades rotate according to a first blade pitch schedule and a second set of fan blades rotate according to a second blade pitch schedule, and wherein the first set of fan blades and the second set of fan blades do not rotate through flat pitch at the same time.

6. The actuation assembly of claim 5, wherein the first blade pitch schedule and the second blade pitch schedule are the same except when rotating through flat pitch.

7. The actuation assembly of claim 5, wherein the first blade pitch schedule and the second blade pitch schedule are different in the reverse thrust position.

8. The actuation assembly of claim 1, wherein an electric motor rotates the scheduling ring relative to the disk.

9. The actuation assembly of claim 1, wherein the variable pitch fan has a blade solidity greater than one.

10. The actuation assembly of claim 1, wherein the variable pitch fan is used in a ducted gas turbine engine configuration.

11. A ducted gas turbine engine defining an axial direction and a radial direction, the gas turbine engine comprising:
    a core engine;
    a variable pitch fan arranged in flow communication with the core engine, the variable pitch fan including a disk and a plurality of fan blades coupled to the disk and extending in a radial direction, the disk and the plurality of fan blades configured to rotate about the axial direction of the ducted gas turbine engine; and
    an actuation assembly configured to change the pitch of the plurality of fan blades about the radial direction, the actuation assembly comprising:
        a scheduling ring defining a first plurality of slots corresponding to a first blade pitch schedule and a second plurality of slots corresponding to a second blade pitch schedule; and
        a plurality of linkage arms, each linkage arm having a first end fixedly connected to one of the plurality of fan blades and a second end slidably coupled to one of the first or second plurality of slots,
        wherein the plurality of fan blades rotate according to the first or second blade pitch schedule as the scheduling ring is rotated relative to the disk, wherein each fan blade rotates on a different blade pitch schedule than adjacent fan blades.

12. The ducted gas turbine engine of claim 11, wherein the variable pitch fan comprises between eight and twenty fan blades rotatably coupled to the disk.

13. The ducted gas turbine engine of claim 11, wherein the variable pitch fan comprises twelve fan blades.

14. The ducted gas turbine engine of claim 11, wherein a first set of fan blades rotates according to the first blade pitch schedule and a second set of fan blades rotates according to the second blade pitch schedule, and wherein the first set of fan blades and the second set of fan blades do not rotate through flat pitch at the same time.

15. The ducted gas turbine engine of claim 14, wherein the first blade pitch schedule and the second blade pitch schedule are the same except when rotating through flat pitch.

16. The ducted gas turbine engine of claim 11, wherein the first blade pitch schedule and the second blade pitch schedule are different in the reverse thrust position.

17. The ducted gas turbine engine of claim 11, wherein an electric motor rotates the scheduling ring relative to the disk.

18. The ducted gas turbine engine of claim 11, wherein the variable pitch fan has a blade solidity greater than one.

\* \* \* \* \*